United States Patent

Richardson

[15] 3,665,689
[45] May 30, 1972

[54] HARVESTER

[72] Inventor: Melvin K. Richardson, Clemson, S.C.

[73] Assignee: Clemson University, Clemson, S.C.

[22] Filed: June 24, 1970

[21] Appl. No.: 49,259

[52] U.S. Cl.................................................56/27.5
[51] Int. Cl........................................................A01d 45/16
[58] Field of Search..................56/14.3, 13.9, 13.5, 27.5

[56] References Cited

UNITED STATES PATENTS 3,466,856   9/1969   Rakestraw...............................56/27.5

Primary Examiner—F. Barry Shay
Assistant Examiner—J. Q. Lever
Attorney—Allison C. Collard

[57] ABSTRACT

A harvester for removing pods from okra stalks or the like. A pair of endless chains are mounted on sprockets in a cutting unit supported by a mobile unit, the chains having plates with angular notches on their inner, meeting course. Each pair of opposed plates close upon the stalk forming a ring around the same and the plates move upwardly on the stalk, and rearwardly, as the mobile unit moves forwardly thus removing the pods from the stalks.

5 Claims, 6 Drawing Figures

INVENTOR.

Melvin K. Richardson

Patented May 30, 1972

INVENTOR.

Milton K. Richardson

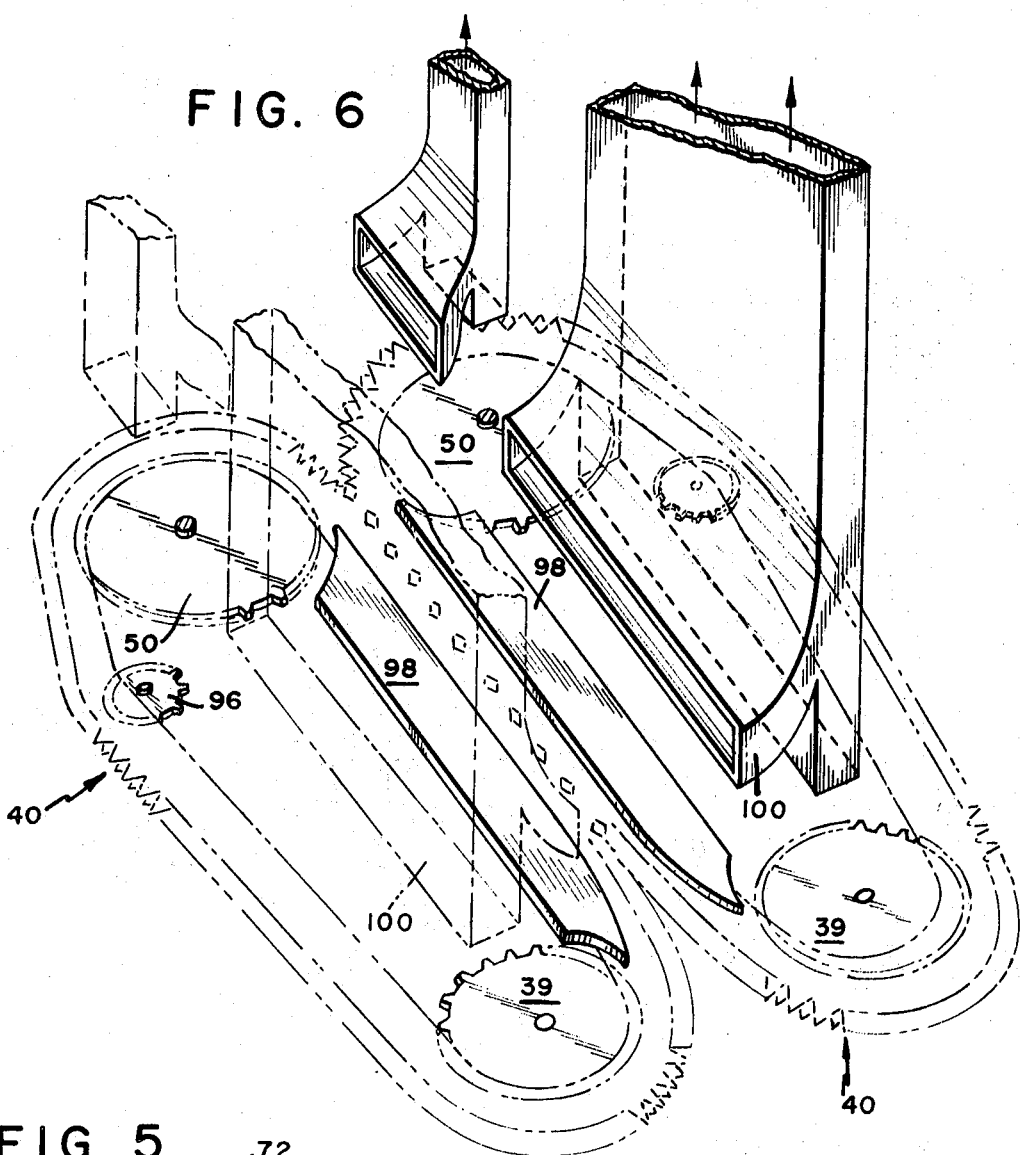
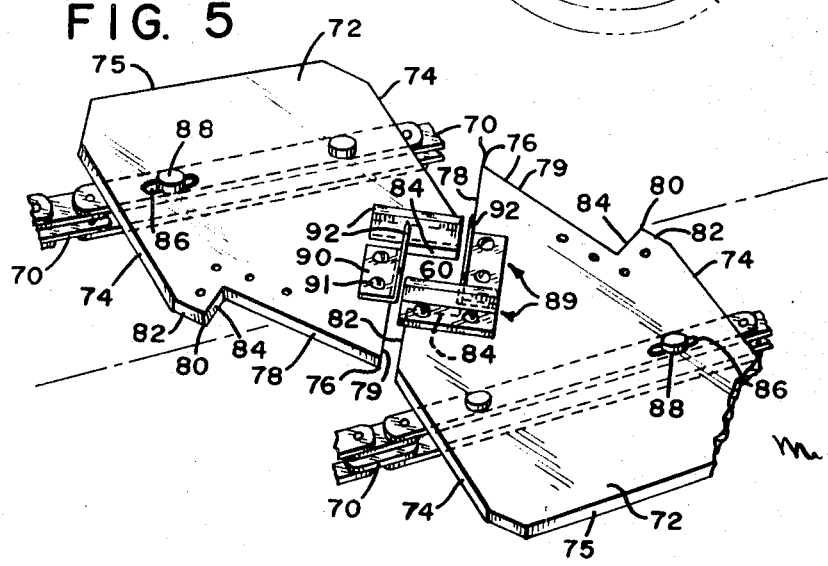

HARVESTER

This invention relates to a novel harvester for removing pods, pod-type elements, leaves, or branches from stalks growing in a row and provided with a novel cutting and stripping assembly with closed slots, one to receive each stalk, and travel upwardly thereon, to remove pods and leaves from the plant in such a way as to cause a minimum amount of bruising and other damage to each. Although applied primarily to okra, the machine described herein may be used to harvest other, similar plants such as tobacco and the like.

The essential novelty in the present invention resides in a cutting unit formed with two longitudinally disposed endless chains whose inner courses have elements which move towards each other, forming said closed slots which encircle the plant and strip or cut the pods therefrom as they travel upwardly and also rearwardly at about the same speed as the harvester unit travels forwardly.

In one form of the invention, the chains are formed from links pivotally joined together and comprising flat plates with points, hereinafter also referred to as locator plate points, extending inwardly towards each other in said inner courses and the movement of the two chains is so correlated as to cause the pointed, generally triangular plates to interleave with each other to provide slots whose edges form generally diamond-shaped, square, or circular openings which close upon and encircle the stalk, thus forming in effect, said closed slots, which on the present machine are diamond-shaped, but which may also be rectangular, square, or circular.

A frame for the cutting unit provides a journal support or bearing for front and rear shafts with sprockets. There are two pairs of said shafts and sprockets, one for each chain, and the general plane of the two chains is inclined upwardly from the front to the rear so that as the successive closed slots travel rearwardly, at about the same speed as the harvester travels forwardly, the edges of the slots, which have cutting elements, thereon, travel upwardly, cut and strip the leaves and pods from the stalk.

The plants may be arranged to grow any distance apart in each row. It is not necessary that the distance between plants be an integral multiple of the distance between the slots on the harvester. Stalks are located and forced into the forming slots by the coming together of upper locator plate points with lower locator plate points. Most stalks are contacted first by one or the other of the locator plates and slide toward one of the slots being formed by the converging locator plates. The stalk being located is thus enclosed by the plates without being damaged, regardless of the position of the stalk along the row. The greatest distance that any one stalk must bend is one-half the distance between two slots. A stalk is pushed into one or the other of the slots by the edges of the upper and lower locator plates, regardless of the position of the stalk relative to the slots. Synchronization of machine speed and chain speed is all that is required, this being to provide a vertical velocity only of the slots relative to the stalks.

In the drawings

FIG. 5 is a broken plan view of two of the upper locator plates and the chain which supports them;

FIG. 6 is a perspective view showing the cutting assembly and the collection means for the pods.

Figure 1:
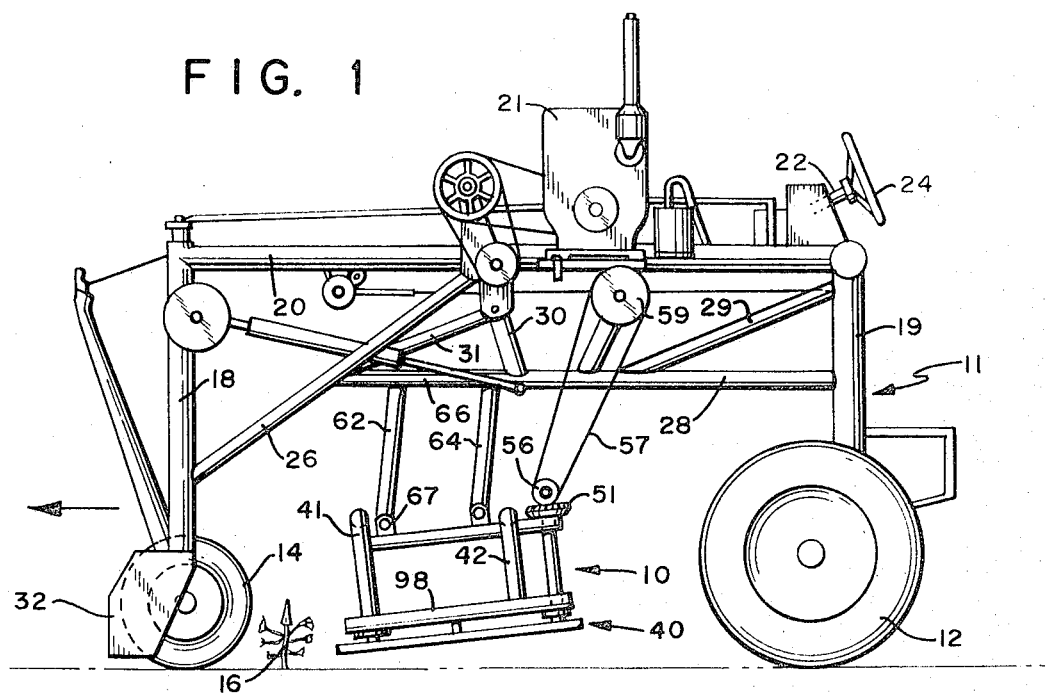
FIG. 1 is a side elevation of the okra harvesting machine of the present invention.

The okra harvesting machine includes a cutting assembly 10, which is supported by a tractor 11, which may be of conventional construction including spaced rear wheels 12 and front wheels 14 which are spaced apart a sufficient distance to straddle one or more rows of the stalks shown at 16. In some instances, the tractor must be modified in a few respects to accomodate, support and drive the cutting and stripping mechanism of the present invention. The tractor has front and rear vertical frame members 18 and 19 connected by a longitudinal structural element 20 which supports an engine 21 and a shaft 22 for a steering wheel 24. It has a number of braces including a front diagonal brace 26, a rear horizontal brace 28, and other bracing elements 29, 30 and 31. The front wheel 14 is shown with a conventional hood 32.

The cutting assembly has a frame formed from structural elements suitably welded together and including a pair of spaced longitudinal members 34 with bearing plates 36 welded at their forward ends which support front shafts 38 for sprockets 39 which support the forward ends of the endless stripping chain assemblies 40. The longitudinal frame members 34 are maintained in spaced relation at their forward ends by an inverted U-shaped member 41 with vertical portions 43.

At the rear, there are short vertical frame members 42, a cross member 44 and an angle bar 45 with openings which form upper bearings for shafts 46. On each side of frame 10 a structural angle bar 48 is welded at its rear end to vertical frame 42 and at its forward end to vertical frame 43. The lower ends of shafts 46 are journalled in bearings 49 and the rear sprockets 50 have a somewhat larger diameter than front sprockets 39. A crown type bevelled gear 51 is fast on the upper end of each shaft 46 and these are driven by gears 52 fast at opposite ends of a transverse shaft 54 journalled in bearings 55 mounted on the frame. This shaft also has a chain sprocket 56 fast thereon. The engine 21 does not drive the sprocket 59 directly, but instead sprocket 59 is driven by a chain and a sprocket which is attached to the rear wheel driveshaft. The sprocket diameter ratios are chosen so that the cutting-stripping chain 40 is driven rearwardly at the same speed that the tractor moves forward.

It will be noted from FIG. 1 that the forward end of the cutting assembly and the cutting and stripping chains carried thereby are lower than the rear end so that when each stalk enters the slot, shown at 60 between the two opposed cutting and stripping chains, the portions of the slot surrounding the stalk travel upwardly on the stalk and perform the cutting and stripping action hereinafter described.

Front and rear links 62 and 64 extending downwardly from frame member 66 support the cutting assembly by means of brackets 67. The links can be varied in length to provide for varying the rearward inclination of the assembly. Frame member 66 is one element of a double four bar linkage which is hinged to the tractor frame 28, and is raised and lowered by a hydraulic cylinder, providing means of raising and lowering the frame of the cutting assembly during operation of the machine, and at the same time maintaining the same rearward inclination of the assembly.

Each stripping chain assembly includes an endless chain with links 70, the chain being supported by the front sprocket 39, rear sprocket 50, and spaced lower locator plates 71 and upper locator plates 72. Cutting elements 89 are secured only to the upper plates but otherwise upper and lower plates are similar. They are generally rectangular shape with opposed generally straight edges 74, a straight edge 75 and a fourth edge 78 which has a V-shaped point 76 at the center of the edge. Point 76 is generally slightly rounded, and is the said locator plate point. The two chain assemblies have outer courses and inner courses where the opposed meeting edges of the plates are in partially overlapping relation. It is these overlapping edges which will be referred to as the "inner edges" of the plates in describing their special contour.

This inner edge of the plate has intersecting edge sections 78 and 79 having an angular relation to each other. This angle may be more or less than 90°. At the inner end of each of edge sections 78 and 79, there is another V-shaped point 80 much smaller than the first or central one and formed by edge sections 82 and 84, the latter being at the inner end of edges 78 and 79.

Figure 3:
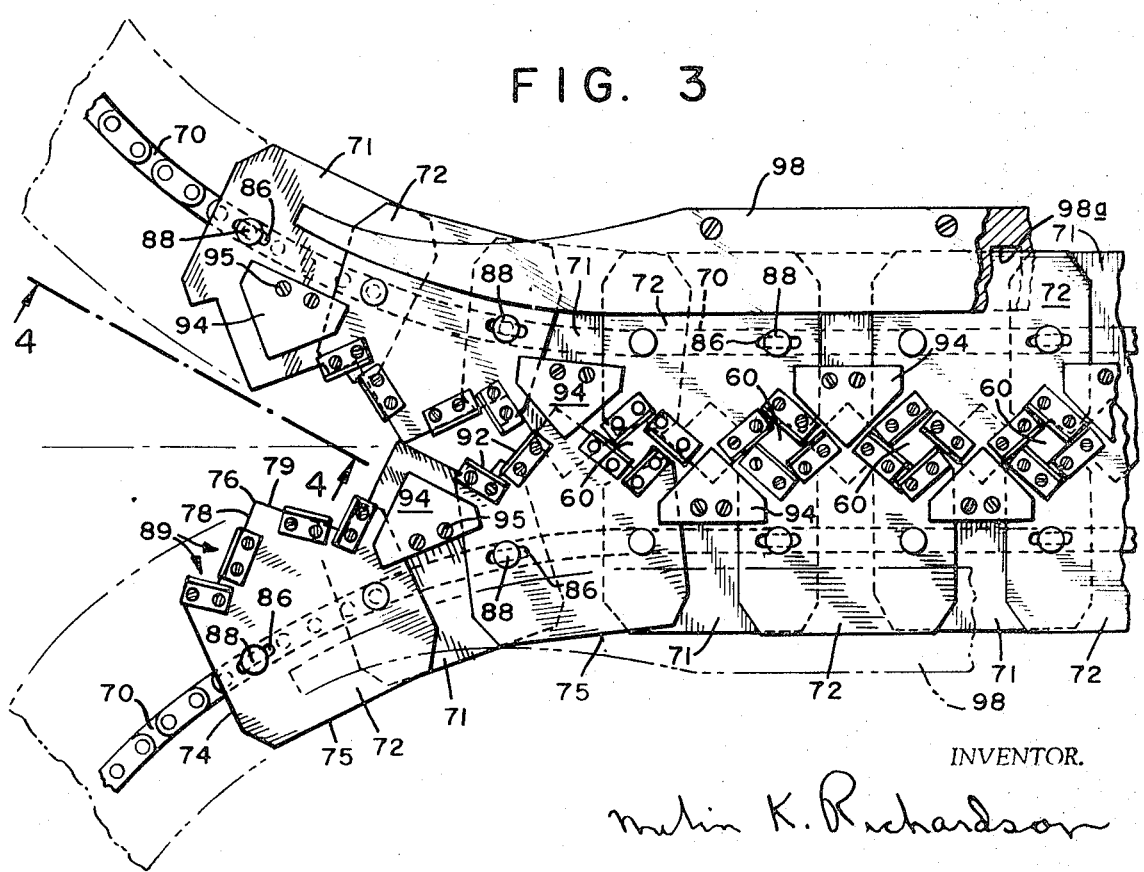
FIG. 3 is a broken top plan view of the cutting element.
Figure 2:
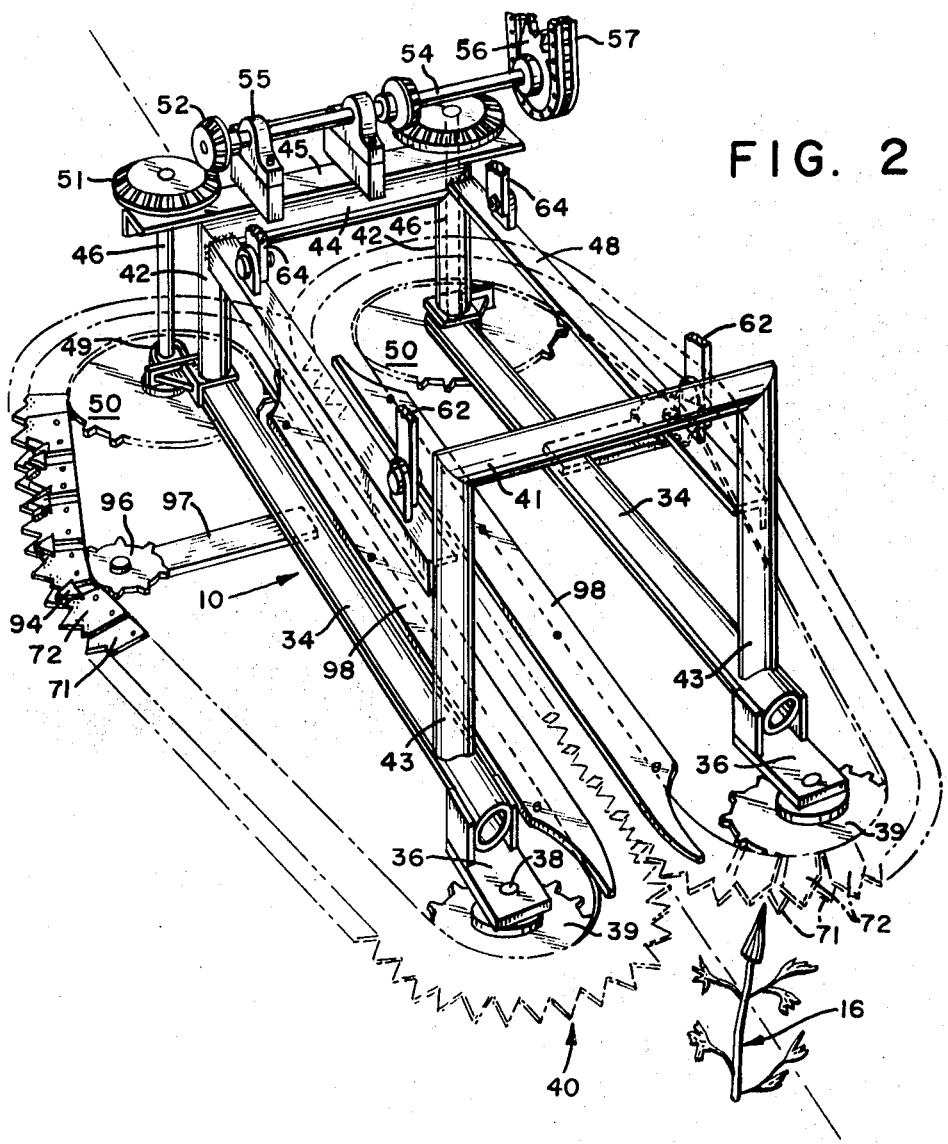
FIG. 2 is a perspective view of the cutting unit.
Figure 4:
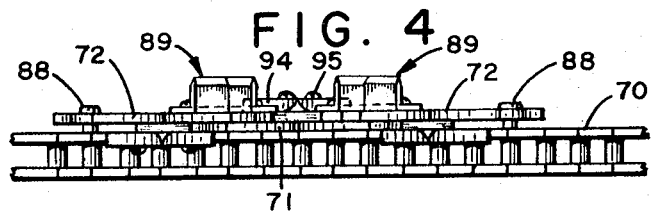
FIG. 4 is a broken section taken through the chain and the cutting elements supported thereby.

It will be noted from FIG. 3 that the opposed side edges 74 of each upper plate 72 overlay the edges of each lower plate and aligned slots 86 therein receive headed pins 88 which pass through both plates and into aligned holes in adjacent links 70.

Each upper plate and each lower plate contains one hole through which one pin passes, and one slot through which the other pin passes, in order to allow the supporting chain 70 to go around the sprockets without binding.

An angular cutting element 89 has a horizontal base 90 secured by screws 91 to edge 79, and a vertical section with a cutting edge 92 at its upper end. A similar cutting element is secured along each of edges 78 in the upper plate. The faces of cutting elements 89 are inclined outwardly from the vertical, so that the blades will not cut the stalk, but only the edges of the slot will contact the stalk. However, any protrusion from the stalk is cut off by the blades. If the pods and leaves which are to be removed are at a sufficiently large angle from the stalk, the leaf stem and the pod stem are cut through by the cutting edge 92. However, if the pod stem is not cut through by cutting edge 92, the slot serves as a restricted opening, filled mostly by the stalk, and the pod stem is broken or snapped by action of the upward moving slot, thus stripping the pod from the stalk. Thus the inclined cutting elements 92 and the plates forming the slot act either singularly to cut the leaves and pods from the stalk, or act in combination to partially cut and partially strip the leaves and pods from the stalk, either process avoiding damage to the stalk. Each lower plate 71 has a small guide plate 94 attached to its upper surface with a spacer between the lower plate and guide plate, the three parts being held together by rivets or screws 95. A notch is thus formed between the lower plate and the guide plate into which the point of the opposing top plate can enter as the slots are formed by the converging chains. A similar guide plate and spacer is fastened to the bottom surface of each top plate, forming a notch to receive the point of the opposing bottom plate. The pairs of notches formed by the small guide plates 94 serve to interlock the converging plates, forming rigid slot 60 around the stalk, preventing rotation of the plates about an axis parallel to the row of slots.

Chain guide plates 98 are attached rigidly by bolts to longitudinal members 34 on either side of the row of formed slots. Each plate contains a groove 98a, having upper and lower surfaces, through which pass the outer edges 75 of the upper and lower plates 72 and 71. The lower inner edge of the chain guide plate forms a guide for the rollers on the chain with links 70, the guide serving to keep the chain in a straight line while the slots are closed around the stalks. The chain guide plates are usually aligned parallel to each other so that the formed slots remain a fixed size throughout the cutting-stripping operation, regardless of the forces exerted on the edges of the slots by the stalks, pods, and leaves. Chain guide plates 98 can also be adjusted to converge from front to rear in order to reduce the size of each slot as it travels upward on the stalk, providing for proper slot size around stalks which become progressively smaller from bottom to top. If the application should warrant, slots could be made to enlarge as they travel upward by adjusting the chain guide plates to diverge from front to rear. In addition to providing means for controlling slot size, chain guide plates 98 also combine in action with small guide plates 94 to prevent rotation of upper plates 72 and lower plates 71 about an axis parallel to the row of slots, and further serve to prevent sagging of chain 70 and plates 71 and 72, thus ensuring uniform progression of the slots upward along the stalks as the machine moves forward.

The collection means consists of a vacuum system with ducts 100 for removing those leaves and pods which have been severed from the stalks. If necessary or desirable, catching pans may be added below the cutting-stripping chains 40 and conventional conveyor belts used to convey collected material from said pans to receiving boxes or bins.

What is claimed:

1. A harvester for removing fruit from stalks and comprising a cutting assembly which is inclined upwardly from front to rear, a mobile unit including a frame supporting the cutting assembly with means for varying its inclination and cutting height, the cutting assembly comprising a frame, pairs of front and rear sprockets mounted on shafts journalled on the latter frame, an endless chain assembly formed with notches mounted on each pair of sprockets, spaced members carried on each chain assembly and extending upwardly therefrom, notched elements with V-shaped inner ends carried on each adjacent pair of members which move inwardly to enclose a stalk, means for moving the members rearwardly as the mobile unit moves forwardly, thus stripping the fruit from the stalk.

2. A harvester for removing fruit from stalks and comprising a cutting assembly which is inclined upwardly from front to rear, a mobile unit including a frame supporting the cutting assembly with means for varying its inclination and cutting height, the cutting assembly comprising a frame, pairs of front and rear sprockets mounted on shafts journalled on the latter frame, an endless link chain mounted on each pair of sprockets and pivotally interconnected, alternate upper and lower flat plates mounted on the links of the chains and whose opposed, inner edges partially overlap, each inner edge having opposed, right angular notches leaving a V-shaped point therebetween, the opposed notches in the plates forming a plurality of openings closed on all sides, each of which encircles a successive stalk, means for moving the unit forwardly centrally of the row of stalks and the inner courses of said chains move rearwardly to cause the openings to travel upwardly on the stalk, and cutting elements secured along said edge.

3. The structure defined in claim 2 wherein front and rear links support the cutting assembly frame.

4. The defined in claim 2 wherein cutting elements are secured along the edges of the opposed notches in the plates to cut the fruit from the stalks.

5. The structure defined in claim 2 wherein the V-shaped points in the lower plates overlap the similar points in the upper plates.

\* \* \* \* \*